United States Patent
Åsen et al.

(10) Patent No.: US 7,422,624 B2
(45) Date of Patent: Sep. 9, 2008

(54) METHOD FOR OPERATING ONE OR MORE ELECTROLYSISCELLS FOR PRODUCTION OF ALUMINIUM

(75) Inventors: Knut Ingvar Åsen, Porsgrunn (NO); Stein Julsrud, Skien (NO); Ole-Jacob Siljan, Skien (NO)

(73) Assignee: Norsk Hydro ASA, Oslo (NO)

( * ) Notice: Subject to any disclaimer, the term of this patent is extended or adjusted under 35 U.S.C. 154(b) by 491 days.

(21) Appl. No.: 10/531,384

(22) PCT Filed: Oct. 10, 2003

(86) PCT No.: PCT/NO03/00340

§ 371 (c)(1),
(2), (4) Date: Jul. 20, 2005

(87) PCT Pub. No.: WO2004/035869

PCT Pub. Date: Apr. 29, 2004

(65) Prior Publication Data

US 2006/0162555 A1    Jul. 27, 2006

(30) Foreign Application Priority Data

Oct. 16, 2002    (NO) .................................. 20024968

(51) Int. Cl.
*B01D 53/22*    (2006.01)
*C25C 3/06*    (2006.01)

(52) U.S. Cl. ............................ 95/54; 95/45; 96/4; 96/7; 96/9; 204/242; 204/243.1; 204/244; 204/245; 204/247; 205/372; 205/391; 205/560; 429/12; 55/385.1

(58) Field of Classification Search ................. 96/4, 96/7, 9; 95/45, 54; 204/242, 243.1, 244, 204/245, 246, 247; 205/372, 391, 560; 429/12; 55/385.1

See application file for complete search history.

(56) References Cited

U.S. PATENT DOCUMENTS

| 4,053,375 | A | | 10/1977 | Roberts et al. | |
|---|---|---|---|---|---|
| 4,681,671 | A | * | 7/1987 | Duruz | 204/245 |
| 5,725,744 | A | * | 3/1998 | de Nora et al. | 204/247 |
| 5,938,914 | A | * | 8/1999 | Dawless et al. | 204/247 |
| 5,942,097 | A | * | 8/1999 | Rapp | 204/246 |
| 6,066,247 | A | * | 5/2000 | Sharma | 205/372 |
| 6,117,302 | A | | 9/2000 | Roha | |
| 6,298,664 | B1 | * | 10/2001 | Asen et al. | 60/649 |
| 2007/0251237 | A1 | * | 11/2007 | Zachar | 60/641.2 |
| 2007/0264184 | A1 | * | 11/2007 | Krass | 423/345 |

FOREIGN PATENT DOCUMENTS

| WO | 9855208 | | 12/1998 |
|---|---|---|---|
| WO | 02066709 | | 8/2002 |
| WO | WO 02/066709 A1 | * | 8/2002 |

* cited by examiner

*Primary Examiner*—Jason M Greene
(74) *Attorney, Agent, or Firm*—Wenderoth, Lind & Ponack, L.L.P.

(57) ABSTRACT

A method for operating one or more electrolysis cells (43, 154, 243) for production of aluminium, the cell comprising inert or substantially inert anodes, where an oxygen containing gas (21, 126, 221) evolved by the electrolysis process in the cell is gathered and removed therefrom. The oxygen containing gas is introduced into a combustion chamber (38, 149, 238) where it is reacted with a carbon containing gas (7, 116, 209) in a combustion process. Emissions of $CO_2$ and $NO_x$ can be reduced.

21 Claims, 4 Drawing Sheets

METHOD FOR OPERATING ONE OR MORE ELECTROLYSISCELLS FOR PRODUCTION OF ALUMINIUM

FIELD OF INVENTION

The present invention relates to an improved method for manufacturing aluminium in a way that implies reduced effluent of pollutants and further to the use of pure oxygen gas produced electrochemically as a by-product during aluminium electrolysis of alumina in molten fluoride electrolyte with dimensionally stable anode technology. The oxygen is used as feedstock for combustion of natural gas, or other carbon based fuels, in an electric power plant producing only pure $CO_2$ and water vapour as off-gasses. The present invention relates especially to the synergies of combining dimensionally stable anode technology in aluminium electrolysis with the ceramic membrane technology for oxygen transport utilised in a pollution free power plant.

BACKGROUND ART

Conventionally, aluminium is produced by the electrolysis of alumina dissolved in a cryolite based molten salt bath in the more than a hundred years old Hall-Heroult process. In this process carbon electrodes are used, where the carbon anode taking part in the cell reaction resulting in the simultaneous production of $CO_2$ and aluminium according to the equation:

$$2Al_2O_3 + 3C = 4Al + 3CO_2 \quad (1)$$

The carbon anodes of today's cells are consumed in the process with a gross anode consumption of some 500 to 550 kg of carbon per ton aluminium produced. The use of carbon anodes results in the production of pollutant greenhouse gases like CO and $CO_2$ in addition to the so-called PFC gases ($CF_4$, $C_2F_6$, etc.).

Edwards, L. and Kvande, H.: "*Inert anodes and other technology changes in the aluminium industry—The benefits Challanges, and impact on present technology*", JOM, 28-33, May, 2001, have estimated the specific $CO_2$-equivalent emissions from various production process for todays average aluminium electrolysis cells with carbon anodes. Omitting the $CO_2$ emissions from the power production processes as well as from bauxite mining and alumina production, Edwards and Kvandes data show that the world average emissions equals some 3.7 tonne $CO_2$-equivalents per tonne of aluminium produced. New, modern aluminium smelters with prebake technology erected today usually have annual capacities in the range 230-260 kt aluminium. For such smelters, the emissions of $CO_2$ and PFCs from anode production and electrolysis usually is approx. 1.8 tonne $CO_2$-equivalents per tonne of aluminium produced, i.e. amounting to some 410-470 kt $CO_2$-equivalents anually. The demonstrated gap between BAT electrolysis data and the world average data is of course due to the high tonnages of aluminium produced in old plants with poorer emission control (i.e. Søderberg plants).

U.S. Pat. No. 6,117,302 discloses a method and an apparatus for electrolytically smelting alumina to produce aluminium metal, where a solide oxide fuel cell and an electrolytic smelting cell are combined in an integrated manner. In one embodiment, oxygen gas evolved at one inert anode in said smelting cell is allowed to flow to the cathode side of the fuel cell where it is reduced. In one aspect, an alumina ore refinery for producing refined alumina is positioned near the solid oxide fuel cell. One advantage with this combination is that heat generated in one part of the apparatus may be exploited in an other part of it.

Due to the consumption of the carbon anode and the electrolysis process causing emissions of greenhouse gases as $CO_2$ and fluorocarbon compounds, the replacement of carbon anodes with an effectively inert material would be highly advantageous for both cost and environmental reasons. With a dimensionally stable, oxygen evolving anode (i.e. an inert anode), used in the electrowinning of aluminium oxide, the net reaction would be:

$$2Al_2O_3 = 2Al + 3O_2 \quad (2)$$

This means that a 250 kt aluminium primary production plant would emit some 450 kt of oxygen. The produced oxygen gas can be collected in the off-gas system and purified with respect to removal of dust, electrolyte particles and fluoride vapours. The produced oxygen then represents a commercial value, and can be compressed and sold as liquid/ pressurised oxygen in an existing world marked. The economic value of 450 kt oxygen from a 250 kt aluminium plant would be in the order of 10-15 million US$. The mentioned volume of oxygen, however, is most likely to large for the cylinder market and only world scale production units can make use of such a large amount of oxygen. This probably require an oxygen consuming large scale production plant (e.g. methanol plant, GTL plant, steel production plant, power generation plant, etc.) close to the aluminium plant in order to make use of the oxygen. Therefore, it seems more economically and technically feasible to utilise the produced and purified oxygen on site (, i.e. omitting the cost accompanied by construction a liquid oxygen production facility).

An aluminium production plant would require a substantial amount of electric power. A 250 kt aluminium primary production plant would need about 340 cells with a cellvoltage each of 4.2 V and an amperage of 260 kA, if a current efficiency of 96% is assumed. Thus approximately a 370-400 MW power plant is needed to supply electricity to the aluminium plant.

The main object of the present invention was to arrive at an improved process for manufacturing aluminium.

Another object of the present invention was to manufacture aluminium in a way that implies reduced effluent of pollutants.

Furthermore, another object of the present invention was to arrive at a method for utilisation of oxygen that are generated in the said aluminium process for improving the performance of the electric power generating process and to significantly reduce or eliminate the effluent from said integrated power generating process.

One problem the inventors faced in their search for an improved aluminium process with reduced emissions, was that the aluminium process needed a significant amount of electric power. Conventional natural gas based power generating processes could not be adopted due to significant emissions of both $CO_2$ and $NO_x$ from these processes. In many countries hydroelectric power or other none $CO_2$ emitting power generation processes is not available, too expensive, or is already exploited.

Furthermore, it would be advantageous to be able to utilise oxygen generated in the aluminium process to improve the performance and reduce the cost of the applied power generation plant.

Furthermore, since the integrated aluminium and power generating plant both (in most cases) needs imported $Al_2O_3$ and fossil fuel and that $CO_2$ must be exported to a geological formation for deposition, location close to a gas terminal, harbour or deposition area may be essential.

It would also be advantageous to make use of gases that can be used or is generated in the power plant to improve the operation of the aluminium process. Thus, the inventors started to look for solutions that might meet all these requirements.

In conventional power generating processes fuelled with a methane containing fuel, carbon dioxide and water (steam) will be produced according to the reaction:

$$CH_4 + 2O_2 = CO_2 + 2H_2O$$

Other hydrocarbons will produce $CO_2$ and $H_2O$ according to the reaction:

$$C_mH_n + ((4m+n)/4)*O_2 = mCO_2 + (n/2)H_2O,$$ m and n being the number of atoms of carbon and net hydrogen, respectively.

The fuel to electric power efficiency will be typically 55% based on the low heating value of the fuel gas. An integrated new inert anode based aluminium plant and fossil fuel based powerplant thus will emit about 1.2 million tons of $CO_2$ per year.

Due to the fact that air is used as oxidant in the combustion process the $CO_2$ in the exhaust gas from the power plant are diluted with nitrogen. Exhaust gas emitted from a natural gas fuelled combined gasturbine and steam cycle power plant contains e.g. only about 4% $CO_2$. The exhaust gas will also contain harmful nitric oxides. Nitric oxides are generated at high temperature in the gasturbine combustion chamber due to the presence of nitrogen in the oxidant i.e. air.

Due to the environmental aspects of $NO_x$ and $CO_2$ it is crucial that the emission of these components to the atmosphere is considerably reduced.

One method to reduce the $CO_2$ emission is to improve the efficiency of the power generating process, but in order to achieve a significant reduction of $CO_2$, this will not be sufficient. Another method is therefore to separate the $CO_2$ from the exhaust gas stream, compress the $CO_2$ and deposit the $CO_2$ in e.g. empty oil and gas reservoirs, in aquifers or use the $CO_2$ for enhanced oil recover or for recovery of methane from deep coil beds.

In order to meet national $NO_x$ control requirements different methods can be used for instance burner modifications, applications of catalytic burners, steam additions or selective catalytic reduction (SCR) of the $NO_x$ in the exhaust gas. Ordinary air used in combustion processes contains about 78% by volume of nitrogen. Some of the nitrogen is oxidised during the combustion to NO, $NO_2$ and $N_2O$ (referred to as thermal $NO_x$). At least 80-98% of the $NO_x$ formed arises from the said oxidation of nitrogen in air. The rest arises from oxidation of the nitrogen content in the fuel. Lowering the peak combustion temperature is a very effective means of reducing the amount of $NO_x$ formed. Unfortunately this causes a substantial efficiency drop due to poor combustion or due to reduced temperature in the combustion chamber in a gas turbine system. SCR (Selective Catalytic reduction) is an efficient method in reducing the $NO_x$, but require a reduction agent such as ammonia and an expensive catalyst installed downstream the combustion process. Formation of $NO_x$ will also be significantly reduced or eliminated if the fuel is combusted with pure oxygen.

$CO_2$ can be removed from exhaust gas, normally discharged off at near atmospheric pressure, by means of several separation processes, e.g. chemical active separation processes, physical absorption processes, adsorption by molecular sieves, membrane separation and cryogenic techniques. Chemical absorption, for instance by means of alkanole amines, is an widely discussed method to separate $CO_2$ from exhaust gas. These separation processes, however, require heavy and voluminous equipment and will consume a substantial amount of heat produced in the combustion process. Applied in connection with a power generating process, these separation processes will reduce the power output with 10-15%. This is mainly due to the low concentration of $CO_2$ in the exhaust gas.

An increasement of the concentration of $CO_2$ in the exhaust gas is, however, possible by burning the carbon containing fuel with pure oxygen instead of air. Another advantage of this is that the generation of nitric oxides is almost eliminated as described above.

Commercial air separation methods (e.g. cryogenic separation or pressure swing absorption (PSA) applied for producing pure oxygen require 250 to 300 KWh/ton oxygen produced. If these methods are used for supplying oxygen to a combustion process in a gas turbine cycle these methods will reduce the net power output from the gas turbine cycle by at least 15%. The expenses of producing oxygen in a cryogenic unit will increase the price of electric power substantially and may amount to as much as 50% of the cost of the electric power.

Therefore, one method of particular interest would be to exploit the purified oxygen from the aluminium electrolysis cells directly as a feed stock for an electric power plant based on natural gas or other fossil fuels to further reduce the emission of $CO_2$ or other harmful compounds to the atmosphere from a integrated aluminium and power generation plant.

As shown above a world scale aluminium plant applying inert anodes will generate about 1250 ton oxygen/day sufficient for a 100 MW power plant. The aluminium plant itself will consume about 370 MW electric power. This means that about 25% of the power may be generated by utilising oxygen from the aluminium process. This also implies that if the generated oxygen is utilised in an oxyfuel based power generation process as described in e.g. patent application WO 99/63210, tentatively 25% of $CO_2$ from natural gas fired power production can be recovered for deposition. The generation of nitric oxides may also be reduced in the same order of magnitude. This solution, however, require design of a rather small oxyfuel plant of about 100 MW and one large conventional power plant.

In order to eliminate the emission of $CO_2$ and $NO_x$ from an integrated aluminium and fossil fuel based power plant about 5000 t oxygen per day is required. An additional amount of 3270 t oxygen per day is therefore needed. Due to the high cost of oxygen produced in a cryogenic or PSA process, application of these air separation techniques is not an attractive solution.

A less energy demanding method than the cryogenic separation methods is known from the European patent application 0658 367-A2. The patent application describes an application of a mixed conducting membrane integrated with a gas turbine system and where the membrane separates oxygen from a heated air stream.

Pure oxygen near atmospheric pressure or below and at high temperature is recovered from the permeate side of the mixed conducting membrane. An oxygen partial pressure difference causes oxygen to be transported through the membrane by reduction of oxygen on the high oxygen partial pressure side (rententate side) and oxidation of oxygen ions to oxygen gas on the low oxygen partial pressure side (the permeate side). In the bulk of the membrane oxygen ions are transported by a diffusion process. Simultaneously the electrons flow from the permeate side back to the feed side of the membrane. The disadvantage of this method is that oxygen is recovered at low pressure while oxygen is needed at high pressure in the combustion process. Cooling and recompression of the recovered oxygen stream necessitate application of expensive process equipment. Recompression will also need mechanical or electrical energy that will reduce the total plant energy efficiency.

A more energy efficient method is known from Norwegian patent application NO-A-972632 (published 07.12.98). This reference describes a power and heat generating process where a fuel is combusted with an oxidant, which is an $O_2/CO_2/H_2O$-containing gaseous mixture, which is supplied from a mixed conducting membrane. The oxygen is picked up from the permeate side of the mixed conducting membrane by means of a sweep gas. The sweep gas is the product or part of the product from at least one combustion process upstream the membrane. In this patent application, the sweep gas, or part of the sweep gas, containing a mixture of mainly $CO_2$ and $H_2O$, also act as the working fluid in a gas turbine cycle. The amount of sweep gas is related to the amount of working fluid required in the gas turbine cycle i.e. to control the temperature in the gas turbine combuster.

In Swedish patent application SE-A-0002037 the $CO_2$ cycle compressor is omitted and a large fraction of the power is generated in a conventional air cycle gas turbine. In this case natural gas is combusted on the permeate side of a mixed conducting membrane and a $CO_2$ and $H_2O$ containing gas mixture is produced. A major part of the heat generated during this combustion process is transferred to the air side in order to heat the air from the gas turbine compressor. Hot air then enter the gas turbine expander to generate electric or mechanical power. The generated hot $CO_2/H_2O$ mixture can be cooled in order to condense water. Thus $CO_2$ can be recovered at high pressure. Alternatively the $CO_2/H_2O$ gas can be depressurized in an expander to produce electric or mechanical power. In this case $CO_2$ will be recovered at low pressure.

Alternatively also described in patent application SE-A-0002037, the mixed conducting membrane or part of the mixed conducting membrane is replaced by a solid oxide fuel cell made of ceramic materials that only conduct oxygen and not electrons. Direct Current then can be produced along with Alternating Current from the gas turbine generator.

By application of oxygen in the power generating process, the exhaust gas from the combustion process will have a high concentration of $CO_2$ and water and generation of nitric oxides are avoided. If water are removed by means of condensation, dry $CO_2$ can be recovered and deposited into a geological formation.

After having evaluated various ways of generating power to a low emission aluminium process, the inventors decided to further investigate integration of the said aluminium process with a mixed conducting membrane based power generation process or alternatively including a solid oxide fuel cell based power generation process.

One requirement was that the oxygen from the aluminium plant should improve the performance of the low emission power generating plant. In Swedish patent application SE-A-0002037, all oxygen utilised in the combustion process are separated by means of a mixed conducting membrane or by means of a pure oxygen conducting membrane. If 25% of the oxygen produced by the membrane is replaced by oxygen generated in the aluminium process, the total membrane area consequently will be reduced with 25%.

It was, however, found that the addition of oxygen to the membrane based power generation process could reduce the membrane area with more than 25%. The driving force for transportation of oxygen through the mixed conducting membrane is the difference in the partial pressure of oxygen between the retentate side and the permeate side. Thus, if oxygen recovered from the aluminium process is added to the combustion process less oxygen needs to be extracted from the air stream. This means that the average partial pressure of oxygen on the air side will increase, assuming the same turbine inlet temperature in both cases to maintain gas turbine efficiency. This will increase the transport of oxygen per square meter through the membrane which will further reduce the size and cost of said membrane.

In Swedish patent application SE-A-0002037 compressed hot $CO_2$ and $H_2O$ containing exhaust gas enter a purge gas turbine to recover heat as mechanical power. If the compressed hot exhaust gas is mixed with fuel and recycled $CO_2$ and oxygen from the aluminium plant and further combusted, this will increase the power generation in the purge gas turbine. Since more power is generated in the purge gas turbine less power needs to be generated in the main gas turbine, also reducing the total membrane area with about 25%. Since about 25% less energy needs to be transferred to the air stream, the total heat exchanger area also will be reduced with about 25%.

If a solid oxide fuel cell is integrated with the power generation process less than 80% of the fuel added to the fuel cell will be converted or combusted. Oxygen recovered from the aluminium process then can be used to combust unconverted gas to $CO_2$ and water. Heat from the combustion of unconverted fuel can be used to pre-heat air to the solid oxide fuel cell.

Another requirement was that gas generated in the power generation process should improve the operation of the aluminium process. In order to remove oxygen generated at the aluminium anodes, application of a sweep gas would be preferable. Since pure oxygen is very aggressive against most materials it is an advantage to dilute the oxygen to a certain degree to reduce hazard risks or improve lifetime of equipment. In most cases pure oxygen also must be diluted to be used in a combustion process to control the combustion temperature. $CO_2$ recovered from the power plant can then be used both as sweep gas in the aluminium process to improve operation and as dilutant in the combustion process in the low emission power generation process. If used as sweep gas in the aluminium process the $CO_2$ gas, however, need to be dry without moisture. In the present invention one part of the partly dried $CO_2$ is further dried by means of a commonly known gas drying process, and is fed to the aluminium plant to be used as anode sweepgas. The recovered mixture of $CO_2$ and oxygen is purified with respect to removal of dust, electrolyte particles and fluoride vapours. The purified oxygen gas mixture then can be compressed to elevated pressure to be used as oxidant in the low emission power generation process.

BRIEF DESCRIPTION OF THE PRESENT INVENTION

The invention will be further explained and envisaged in the examples and corresponding figures.

DESCRIPTION OF THE PRESENT INVENTION

Figure 1:
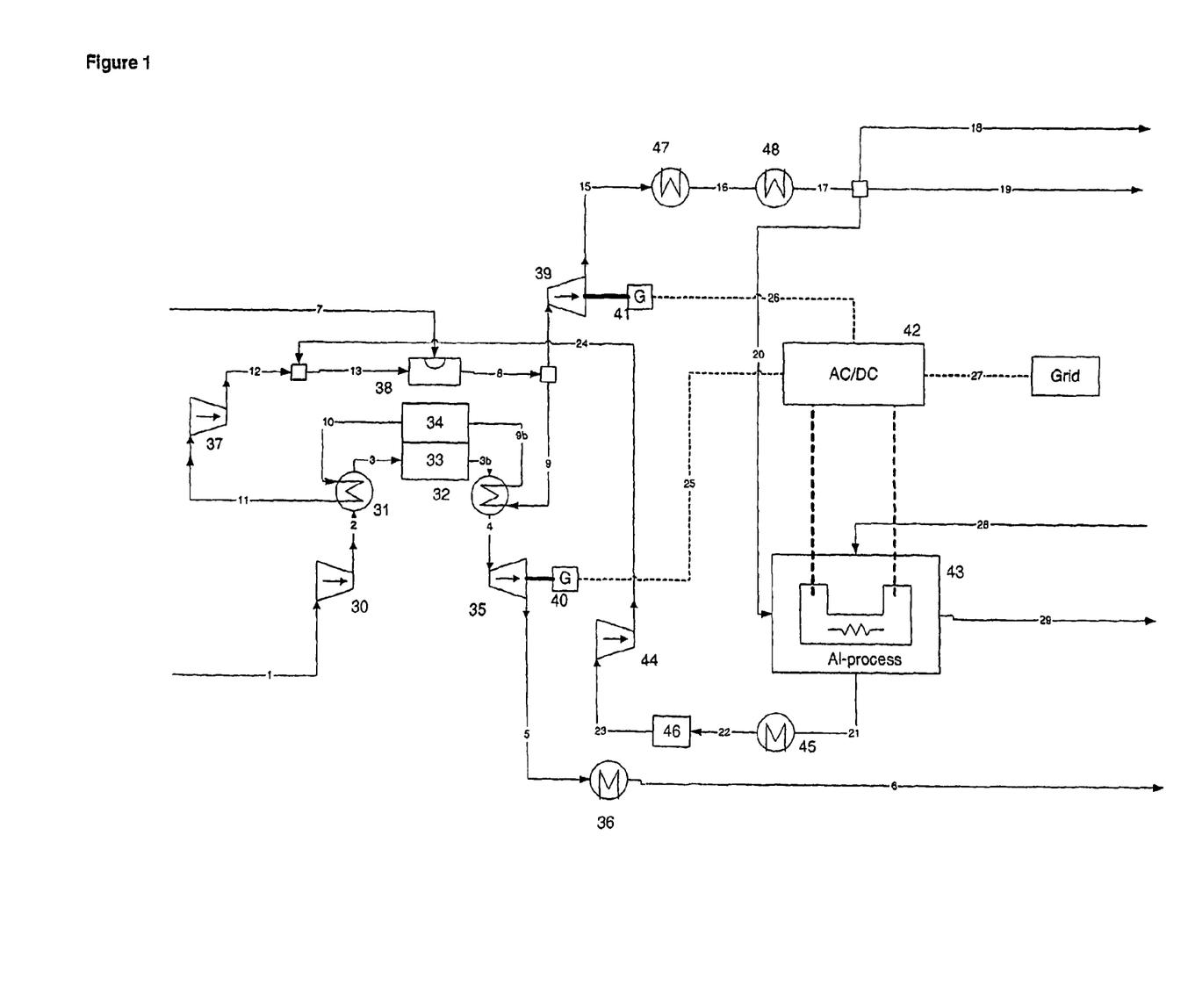
FIG. 1 shows a mixed conducting membrane based power generation process where generated $CO_2$ is used to sweep the anodes in the aluminium process and where oxygen recovered from the anodes is cleaned and fed according to the present invention to the $CO_2$ recycle loop in the power generation process.

FIG. 1:

Air (stream 1) at ambient temperature and pressure enter compressor 30 to be compressed to between 5 and 50 bar. Compressed air (stream 2) is preheated in heat exchanger 31 to between 700 and 1100 C and further fed to the retentate side 33 of a mixed conducting membrane system 32 where a part of the oxygen in the heated air stream is transported through the mixed conducting membrane to the permeate side 34. Oxygen depleted air stream 3b is optionally further heated in heat exchanger 31b to above 1100 C. Hot oxygen depleted air (stream 4) enter turbine 35 where electrical power is recovered in generator 40. Heat in exhaust gas (stream 5) at low pressure is recovered in heat exchanger system 36 i.e. as high pressure steam to be used in a steam turbine for generation of electrical power (not shown).

A carbon containing fuel (stream 7) enter combuster 38 where the fuel is combusted with oxygen containing gas stream 13 which is a mixture of oxygen and $CO_2$ containing gas generated in mixed conducting membrane system 32 (stream 12) and oxygen recovered from the aluminium process (stream 24). Hot combusted gas stream 8 is divided in one purge gas stream 14 and a recycled stream 9 which is partly cooled in heat exchanger 31b before it enter the permeate side 34 of the mixed conducting membrane system 32 where oxygen is picked up. The concentration of oxygen in stream 10 will typically be between 5 and 12%. Stream 10 is heat exchanged with stream 2 in heat exchanger 31 and is further recycled by means of compressor 37 and mixed with oxygen and $CO_2$ containing gas (stream 24) from the aluminium process.

Purge gas stream 14 enter turbine 39 and electric power is generated in generator 41. Exhaust gas at low pressure is cooled in heat exchanger system 47 in order to recover heat e.g. as steam to be used in a steam turbine for generation of electrical power (not shown).

Partly cooled exhaust gas (stream 16) is further cooled in e.g. a water cooled heat exchanger 48 in order to condense water (stream 18). One part of the cold exhaust gas (stream 19) is fed to a compressor (not shown) for injection into a geological formation. The other part (stream 20) is optionally further dried and fed to the aluminium process to be used as anode sweep gas in unit 43. $Al_2O_3$ (stream 28) is fed to unit 43 and pure aluminium (stream 29) is produced. Oxygen generated at the anodes in 43 is diluted by means of gas stream 20 and hot oxygen containing gas at 780 to 980 C enter heat recovery system 45 and gas cleaning system 46 where e.g. fluoride compounds are removed. The cleaned gas (stream 23) is compressed in compressor 44 to between 5 and 50 bar and is further added to the recycled gas stream 12.

Figure 2:
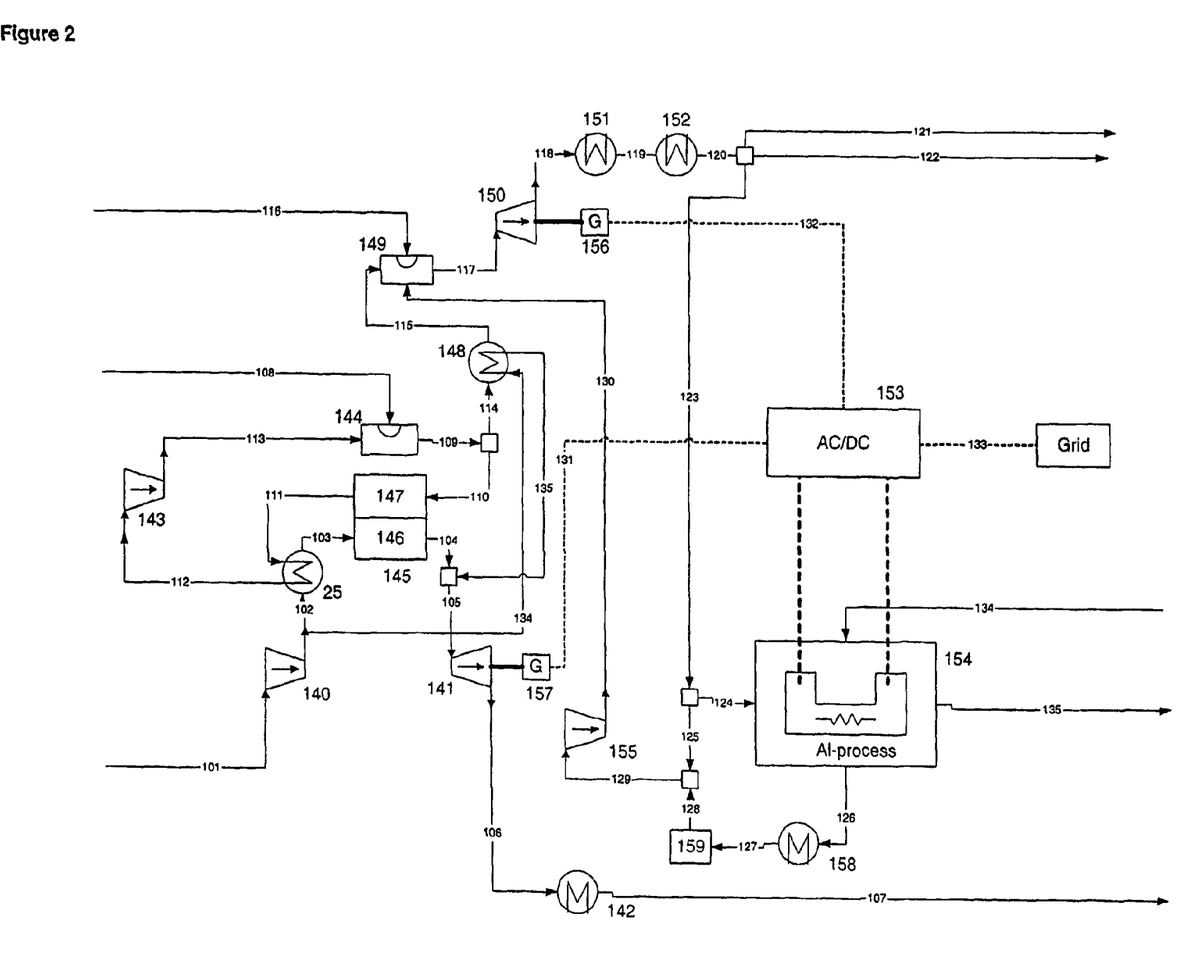
FIG. 2 shows an alternative process to that shown in FIG. 1 where oxygen recovered from the anodes in the aluminium process is used as oxidant in a combuster upstream the $CO_2$ purge gas turbine.

FIG. 2:

Air (stream 101) at ambient temperature and pressure enter compressor 140 to be compressed to between 5 and 50 bar. One part of the compressed air (stream 102) is preheated in heat exchanger 160 to between 700 and 1300 C and further fed to the retentate side 146 of a mixed conducting membrane system 145 where a part of the oxygen in the heated air stream is transported through the mixed conducting membrane to the permeate side 147.

The other part of the compressed air (stream 134) is heated to between 700 and 1300 C in heat exchanger 148 and is further mixed with the oxygen depleted stream 104.

Hot air mixture (stream 105) enter turbine 141 where electrical power is recovered in generator 157. Heat in exhaust gas (stream 106) is recovered in heat exchanger system 142, e.g. as high pressure steam to be used in a steam turbine for generation of electrical power (not shown).

A carbon containing fuel (stream 108) enter combuster 144 where the fuel is combusted with oxygen containing gas stream 113. Hot combusted gas stream 109 is split into one purge gas stream 114 and a recycled stream 110 which enter the permeate side 147 of the mixed conducting membrane system 145 where oxygen is picked up. The concentration of oxygen in stream 111 will typically be between 5 and 12%. Stream 111 is then heat exchanged with stream 102 in heat exchanger 160 and is further recycled by means of compressor 143.

Purge gas stream 114 is cooled in heat exchanger 148 and enter combuster 149 together with oxygen containing gas stream 130 form the aluminium process. A carbon containing fuel (stream 116) is combusted, and the hot combusted gas stream 117 enter turbine 150 and electric power is generated in generator 156. Exhaust gas at low pressure (stream 118) is cooled in heat exchanger system 151 in order to recover heat e.g. as steam to be used in a steam turbine for generation of electrical power (not shown).

Partly cooled exhaust gas (stream 119) is further cooled in e.g. a water cooled heat exchanger 152 in order to condense water (stream 121). One part of the cold exhaust gas (stream 122) is fed to a compressor (not shown) for injection into a geological formation.

The other part (stream 123) is optionally further dried and one part (stream 124) is fed to the aluminium process to be used as anode sweep gas in unit 154. $Al_2O_3$ (stream 134) is fed to unit 154 and pure aluminium (stream 135) is produced. Oxygen generated at the anodes in 154 is diluted by means of gas stream 124 and hot oxygen containing gas at 780 to 980 C enter heat recovery system 158 and gas cleaning system 159 where e.g. fluoride compounds are removed. The cleaned gas (stream 128) are optionally mixed with $CO_2$ containing gas stream 125 and is further compressed in compressor 155 to between 5 and 50 bar and is further added to combuster 149 as described above.

Figure 3:
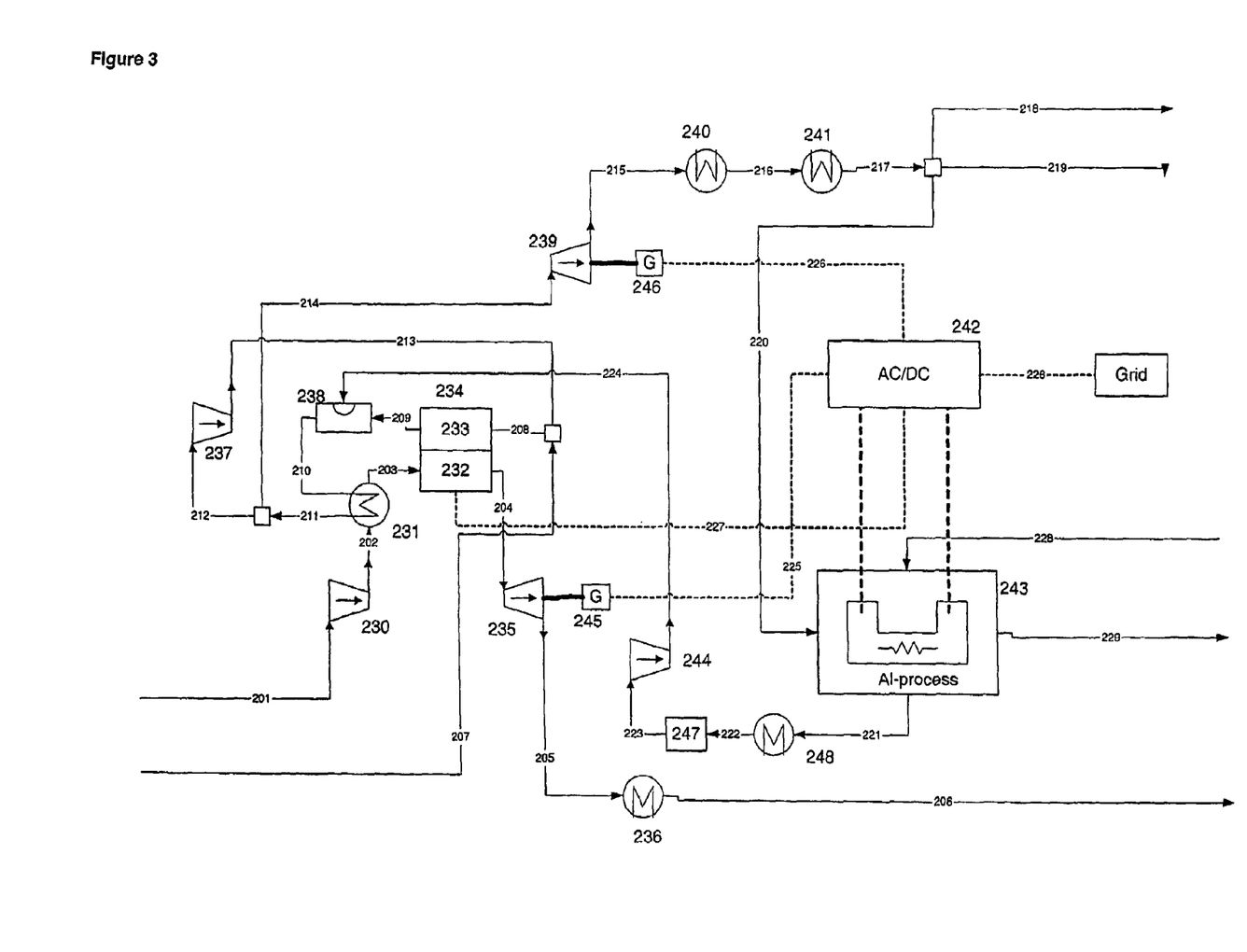
FIG. 3 shows an alternative process to that in FIG. 1 where the mixed conducting membrane or part of the mixed conducting membrane is replaced by a pure oxygen conducting membrane (i.e. a solid oxide fuel cell) and where unconverted fuel from the fuel cell is combusted with oxygen recovered from the aluminium process.

FIG. 3:

Air (stream 201) at ambient temperature and pressure enter compressor 230 to be compressed to between 3 and 40 bar. Compressed air (stream 202) is preheated in heat exchanger 231 to between 500 and 1000 C and further fed to the anode side 232 of a solid oxide fuel cell system 234 where a part of the oxygen in the heated air stream is transported through the fuel cell membrane to the cathode side 233. Hot oxygen depleted air (stream 204) enter turbine 235 where electrical power is recovered in generator 245. Heat in exhaust gas (stream 205) at low pressure is recovered in heat exchanger system 236 i.e. as high pressure steam to be used in a steam turbine for generation of electrical power (not shown).

A compressed carbon containing fuel (stream 207) is mixed with recycled steam and $CO_2$ containing gas stream 213 and enter the cathode side of the solid oxide fuel cell system 234 where fuel is both pre-reformed and further partially oxidised to a mixture of CO, $CO_2$ and $H_2$ and $H_2O$. Between 60 and 90% of the fuel is converted to $CO_2$ and $H_2O$. Stream 209 from fuel cell 234 containing $CO_2$, CO, $H_2$, $H_2O$ and minor amount of $CH_4$ enter a combustion chamber 238 where methane and partially converted methane are combusted with oxygen to $CO_2$ and $H_2O$. Heat generated in the combuster are used to preheat air (stream 202) in heat exchanger 231. Partially cooled exhaust gas (stream 211) are split into two streams, stream 212 and stream 214. Stream 214 is depressurized in turbine 239 to slightly above ambient pressure. Depressurized exhaust gas stream 215 is cooled in heat exchanger 250 and is further cooled in heat exchanger 241 in order to condense water. Condensed water is removed (stream 218).

One part of the cold exhaust gas (stream 219) is fed to a compressor (not shown) for injection into a geological formation. The other part (stream 220) is optionally further dried and fed to the aluminium process to be used as anode sweep gas in unit 243. Al2O3 (stream 228) is fed to unit 243 and pure aluminium (stream 229) is produced. Oxygen generated at the anodes in 243 is diluted by means of gas stream 220 and hot oxygen containing gas at 780 to 980 C enter heat recovery system 248 and gas cleaning system 247 where e.g. fluoride compounds are removed. The cleaned gas (stream 223) is compressed in compressor 244 to between 5 and 50 bar and is further added to combuster 238.

EXAMPLE 1

This example shows a process according to FIG. 1 where the method according to the present invention is utilised in a combined power plant and Aluminium process. It has been assumed that 25% of the total oxygen demand in the power plant is replaced by pressurised $O_2$ at 20 bar from the aluminium plant, which would be introduced before the burner 38 as illustrated in FIG. 1. 6% of $CO_2$ in stream 17 is recycled and used as sweep gas in the aluminium process. The recovered oxygen will in this case contain 12% $CO_2$. Table 1 shows the impact on the partial pressure of oxygen in the gas streams in and out of the membrane unit 32 with addition of oxygen from the aluminium plant. The figures are compared with a membrane system without addition of oxygen.

TABLE 1

|  | With oxygen from the Al plant | No oxygen addition |
|---|---|---|
| Stream 3 | 4.13 bara | 4.13 bara |
| Stream 10 | 1.57 bara | 2.13 bara |
| Stream 3b | 3.24 bara | 2.96 bara |
| Stream 9b | 0.04 bara | 0.04 bara |

An increasing ratio between oxygen in stream 3 and stream 10 and increasing ratio between stream 3b and 9b will reduce required membrane area.

Figure 4:
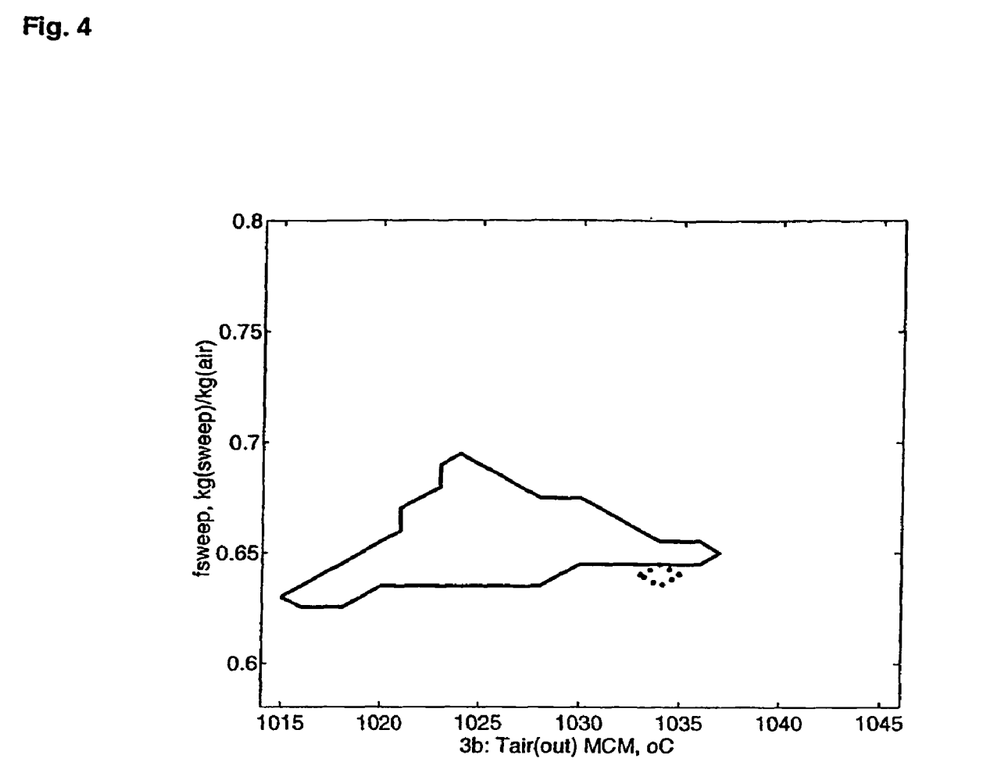
FIG. 4 shows the operating window for a membrane reactor combustion process with and without addition of oxygen. The temperature exit heat exchanger 31b is 1228° C.

FIG. 4 shows the operating window for the membrane reactor combustion process with and without addition of oxygen. $O_2$ is supplied from external source. The temperature exit heat exchanger 31b is 1228° C. The dashed line corresponds to the operating window of a process without oxygen addition. Air exit temperature: $T_{AL2O}=1228°$ C.

Tair(out) MCM is the temperature in stream 3b exit unit 32 for different operation conditions. fsweep is the ratio (in kg) between sweep gas stream 9b and air (stream 3). The operating window with addition of oxygen is much larger than the operating window without addition of oxygen which means that the process with oxygen addition is easier to operate. In addition to the reduced membrane area the heat exchanger area could also be reduced.

E.g. maintaining a similar air temperature at the cold end of the MCM module as in the case without oxygen addition, a higher temperature difference between sweep and air and a higher sweep to air flow ratio are achieved. This will reduce the size of the heat exchangers and the total volume of membrane in unit 32 and volume of heat exchanger (unit 31 and unit 31b) can be reduced to 50%, while maintaining a very similar air temperature profile. This demonstrate the advantage of oxygen addition to the membrane process.

EXAMPLE 2

This example shows a process according to FIG. 2 where the method according to the present invention is utilised in a combined power plant and Aluminium process.

Air (stream 101) at 15 C and atmospheric pressure enter compressor 140 to be compressed to 20 bara. 88% of the compressed air (stream 102) is preheated in heat exchanger 160 to 1000 C and is further fed to the retentate side 146 of a mixed conducting membrane system 145 where 32.4% of the oxygen in the heated air stream is transported through the mixed conducting membrane to the permeate side 147.

The other part of the compressed air (stream 134) is heated to 1200 C in heat exchanger 148 and is further mixed with the oxygen depleted stream 104.

Hot air mixture (stream 105) at 1200 C enter turbine 141 where about 212 MW of electrical power is generated in generator 157. Heat in exhaust gas (stream 106) is recovered in heat exchanger system 142, e.g. as high pressure steam to be used in a steam turbine for generation of about 63 MW of electrical power (not shown).

A carbon containing fuel (stream 108) enter combuster 144 where the fuel is combusted with oxygen containing gas stream 113. Hot combusted gas stream 109 at 1215 C is split into one purge gas stream 114 (14.5%) and a recycled stream 110 (85.5%) which enter the permeate side 147 of the mixed conducting membrane system 145 where oxygen is picked up. The concentration of oxygen in stream 111 is 10.4%. Stream 111 is then cooled to 470 C with stream 102 in heat exchanger 160 and is further recycled by means of compressor 143.

Purge gas stream 114 is cooled in heat exchanger 148 to 515 C and enter combuster 149 together with oxygen containing gas stream 130 from the aluminium process. Stream 130 contains 77% $CO_2$ and 23% $O_2$. A carbon containing fuel (stream 116) is combusted, and the hot combusted gas stream 117 at 1215 C enter turbine 150 and about 81 MW of electric power is generated in generator 156. Exhaust gas at low pressure (stream 118) is cooled in heat exchanger system 151 in order to recover heat e.g. as steam to be used in a steam turbine for generation of about 34 MW of electrical power (not shown).

Partly cooled exhaust gas (stream 119) is further cooled in e.g. a water cooled heat exchanger 152 in order to condense water (stream 121). 40% of the cold exhaust gas (stream 122) is fed to a compressor (not shown) for injection into a geological formation.

The other part (stream 123) (60%) is optionally further dried and one part (stream 124) is fed to the aluminium process to be used as anode sweep gas in unit 154. $Al_2O_3$ (stream 134) is fed to unit 154 and about 250 kt/year pure aluminium (stream 135) is produced. Oxygen generated at the anodes in 154 is diluted by means of gas stream 124 and hot oxygen containing gas at 780 to 980 C enter heat recovery system 158 and gas cleaning system 159 where e.g. fluoride compounds are removed. The cleaned gas (stream 128) are optionally mixed with $CO_2$ containing gas stream 125 and is further compressed in compressor 155 to 21 bara and is further added to combuster 149 as described above.

The described power plant will generate about 390 MW of power sufficient for production of 250 kt aluminium per year.

The efficiency of the power plant will be approximately 51% including recovery of all $CO_2$ ready for deposition. Due to that recovered oxygen is diluted with $CO_2$ to about 23% $O_2$, this will both reduce hazard risks and improve lifetime of equipment in the aluminium plant. The diluted oxygen stream will also avoid a to high temperature in combuster 149.

EXAMPLE 3

This example shows a process according to FIG. 3 where the method according to the present invention is utilised in a combined power plant and Aluminium process to reduce required membrane area and to increase power plant efficiency.

The advantage of addition of oxygen to a solid oxide fuel cell is described below.
Fuel low heating value (LHV): 743 MW
Power generated in fuel cell 234: 300 MW (40% of LHV)
Power generated in turbine 239: 65 MW
Power generated in turbine 235: 304 MW
Power generated in steam turbines: 55 MW
Power used in compressor 230: −190 MW
Power used in compressor 244: 10 MW
Power used in compressor 239: 4 MW
Total Power production: 520 MW
Power plant efficiency: 70%

The power plant efficiency could reach 70% with only 40% fuel cell efficiency and 75% fuel conversion if oxygen from the aluminium process is recycled and used to combust unconverted fuel from the fuel cell in a process according to FIG. 3. A moderate fuel cell efficiency will improve lifetime of the fuel cell. A membrane based afterburner is also avoided which will reduce costs. The oxygen from a 250 kt aluminium plant is sufficient for oxidation of unconverted fuel from a 520 MW fuel cell based power plant. Since the aluminium process need about 370 to 400 MW of power at least 120 MW can be exported or a smaller fuel cell can be installed. In all cases 100% recovery of $CO_2$ is possible and $NO_x$ formation is almost eliminated.

The invention claimed is:

1. A method for operating one or more electrolysis cells for production of aluminium, the cell comprising inert or substantially inert anodes, where an oxygen containing gas evolved by the electrolysis process in the cell is gathered and removed therefrom,
wherein
the oxygen containing gas is introduced into a combustion chamber where it is reacted with a carbon containing gas in a combustion process.

2. A method in accordance with claim 1,
wherein
at least one part of a reaction process stream from the combustion chamber is used in an energy conversion process.

3. A method in accordance with claim 2,
wherein
the energy conversion process comprising expansion of the reaction process stream in a gas-turbine for conversion of energy to mechanical energy.

4. A method in accordance with claim 3,
wherein
the gas-turbine is arranged to drive a generator for the production of electricity.

5. A method in accordance with claim 2,
wherein
at least one part of the reaction process stream containing $CO_2$ is used as sweep gas in the electrolysis cell.

6. A method in accordance with claim 2,
wherein
at least one part of the reaction process stream is directed into a permeate side of a mixed conducting membrane system to pick up oxygen from an air stream through a retentate side of the membrane system, where said oxygen enriched stream is directed back to the combustion chamber.

7. A method in accordance with claim 2,
wherein
at least one part of a reaction process stream from a second combustion chamber is directed into a permeate side of a mixed conducting membrane system to pick up oxygen from an air stream through a retentate side of the membrane system, where said oxygen enriched stream is directed back to said combustion chamber, and where an other part of the reaction process stream is directed to said first combustion chamber.

8. A method in accordance with claim 1,
wherein
said carbon containing gas is derived from a fuel cell.

9. A method in accordance with claim 1,
wherein
substantially all parts of $CO_2$ evolved are recovered and stored.

10. A method in accordance with claim 1,
wherein
formation of $NO_x$ is substantially avoided.

11. A method in accordance with claim 1,
wherein
thermal energy in streams derived from the combustion chamber is recovered by vaporisation of water, whereby generated steam is utilised to generate electric power in one or more steam turbines.

12. A method in accordance with claim 1,
wherein
the oxygen containing gas is cleaned by removal of dust, electrolyte particles and fluoride vapours before it is applied in the combustion chamber.

13. A method in accordance with claim 5, wherein said at least one part of the reaction process stream containing $CO_2$ is dried before it is used as the sweep gas.

14. A method in accordance with claim 3,
wherein
at least one part of the reaction process stream containing $CO_2$ is used as sweep gas in the electrolysis cell.

15. A method in accordance with claim 4,
wherein
at least one part of the reaction process stream containing $CO_2$ is used as sweep gas in the electrolysis cell.

16. A method in accordance with claim 2,
wherein
substantially all parts of $CO_2$ evolved are recovered and stored.

17. A method in accordance with claim 3,
wherein
substantially all parts of $CO_2$ evolved are recovered and stored.

18. A method in accordance with claim 4,
wherein
substantially all parts of $CO_2$ evolved are recovered and stored.

19. A method in accordance with claim 2,
wherein
formation of $NO_x$ is substantially avoided.

20. A method in accordance with claim 3, wherein
formation of $NO_x$ is substantially avoided.

21. A method in accordance with claim 4, wherein the electricity is for use in the electrolysis cell.

* * * * *